(12) United States Patent
Peterson et al.

(10) Patent No.: US 8,487,577 B2
(45) Date of Patent: Jul. 16, 2013

(54) METHOD AND APPARATUS FOR MOTOR CONTROL

(75) Inventors: Gregory A. Peterson, Elgin, IL (US); Michael P. Sullivan, Elgin, IL (US)

(73) Assignee: Nidec Motor Corporation, St. Louis, MO (US)

( * ) Notice: Subject to any disclaimer, the term of this patent is extended or adjusted under 35 U.S.C. 154(b) by 408 days.

(21) Appl. No.: 12/852,134

(22) Filed: Aug. 6, 2010

(65) Prior Publication Data
US 2012/0032624 A1   Feb. 9, 2012

(51) Int. Cl.
*G05B 5/00*   (2006.01)

(52) U.S. Cl.
USPC .......................... 318/478; 318/479; 318/785

(58) Field of Classification Search
USPC .......... 318/478, 479, 785, 567, 569; 135/25.2
See application file for complete search history.

(56) References Cited

U.S. PATENT DOCUMENTS

| | | | |
|---|---|---|---|
| 6,481,652 B2 | 11/2002 | Strutz et al. | |
| 6,854,673 B2 | 2/2005 | Strutz et al. | |
| 7,048,213 B2 | 5/2006 | Strutz et al. | |
| 2009/0314313 A1* | 12/2009 | Classen et al. | 134/25.2 |
| 2010/0318965 A1* | 12/2010 | Brenneman et al. | 717/120 |

FOREIGN PATENT DOCUMENTS

| | | |
|---|---|---|
| EP | 2197101 A1 | 6/2010 |
| JP | 2000000191 A | 1/2000 |
| JP | 2010142322 A | 7/2010 |

OTHER PUBLICATIONS

International Search Report and Written Opinion from PCT Application No. PCT2011/046549 entitled Method and Apparatus for Motor Control (Dated Feb. 18, 2013).
European Translation Patent Abstract for JP 2000000191.
European Translation Patent Abstract for JP 2010142322.

* cited by examiner

*Primary Examiner* — Karen Masih
(74) *Attorney, Agent, or Firm* — Hovey Williams LLP

(57) ABSTRACT

Various embodiments of a motor controller are disclosed. In exemplary embodiments, the motor controller can be instructed to select an operational profile based on the duration of power loss. In an exemplary embodiment, the system comprises a battery or capacitor to provide power to a microcontroller in the motor controller while power is disconnected.

16 Claims, 5 Drawing Sheets

Figure 1 – Prior Art

METHOD AND APPARATUS FOR MOTOR CONTROL

FIELD OF THE INVENTION

The present invention is generally directed toward the field of controlling an electric motor, particularly the configuration of a motor controller for selecting a profile from a plurality of stored profiles and operating the motor according to the selected profile.

BACKGROUND AND SUMMARY OF THE DISCLOSURE

Variable speed motors capable of operating at multiple selectable speeds are well known in the art. It is also well known that a motor controller for a variable speed motor can store multiple operating profiles. For example, a motor controller may store a "quiet" profile that, when activated, configures the motor controller to operate the motor in a quiet mode, e.g., at a low speed setting. Another profile might be called "maximum" and would relate to operating the motor at a high speed.

Various operational profiles for a food waste disposal unit are disclosed in U.S. Pat. Nos. 6,481,652, 6,854,673, and 7,048,213, the entire disclosures of each of which are incorporated by reference herein. For example, U.S. Pat. No. 6,854,673 discloses a motor controller for operating a food waste disposer in operational modes such as soft start mode, optimized grinding mode, idle mode, rinse mode, and anti-jamming mode.

A motor controller may receive an instruction to activate a particular profile from an external electronic device. For example, a dishwashing machine may comprise a dishwasher control unit, a motor, and a motor controller. The dishwasher control unit sends instructions to the motor controller via low-voltage communication lines. The instructions may comprise an instruction to activate a particular stored profile from among a plurality of stored profiles.

The inventors herein have identified several problems with providing dedicated communication lines between a main control unit (e.g., dishwasher control unit) and a motor controller. For example, the communication lines are susceptible to electromagnetic interference and damage. Providing dedicated communication lines may also require communication hardware such as rs232 drivers, optocouplers, or can bus drivers.

In an exemplary embodiment, the inventors herein disclose an innovative technique for communication with a motor controller that does not require dedicated communication lines.

In an exemplary embodiment, the inventors herein disclose an innovative technique for communication with a motor controller by controlling the electrical power provided to the motor.

FIG. 1 depicts an exemplary circuit diagram for a device comprising an electric motor 109. The device comprises a main power supply 101 that may be an alternating current (AC) power supply as is known in the art. Main power supply 101 may or may not comprise a rectifier for converting AC power to direct current (DC) power. The device further comprises a device controller 103 that comprises logic for controlling the high-level operation of the device. For example, in a dishwasher, device controller 103 may comprise logic (such as a microcontroller) for receiving user input (e.g., via buttons and switches) and conducting the operation of various dishwasher components such as a soap dispenser, display lights, one or more water pumps, one or more relays, etc. Relay 105 is operable to connect or disconnect power lines 181 and 183 based on input on control line 191. Motor controller 107 controls the power delivered to motor 109. Device controller 103 operates relay 105 via control line 191 to connect or disconnect power to motor controller 107 and motor 109. Relay 105 may or may not be located within the same housing as device controller 103. Device controller 103 communicates with motor controller 107 via control lines 189. Motor controller 107 may comprise a memory for storing a plurality of motor operation profiles. Device controller 103 may send a profile selection instruction to motor controller 107 via control line 189. In response to such a profile selection instruction, motor controller 107 activates the designated profile and operates the motor 109 according to the profile.

The inventors herein disclose an innovative technique for instructing a motor controller to select an operational profile without a need for dedicated communication lines. In an exemplary embodiment, the motor controller is configured to select an operational profile based on changes in motor power status, as disclosed in detail herein.

DETAILED DESCRIPTION OF THE PREFERRED EMBODIMENTS

Figure 1:
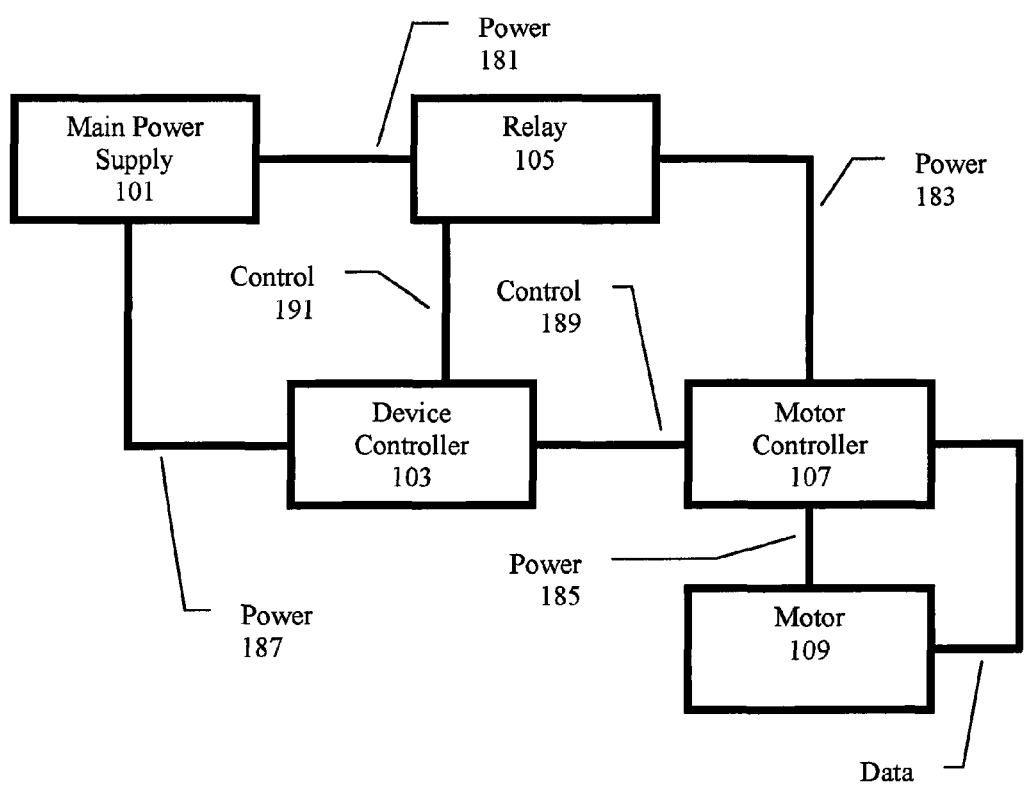
FIG. 1 depicts a prior art system that requires dedicated communication lines for communicating with a motor controller.
Figure 2:
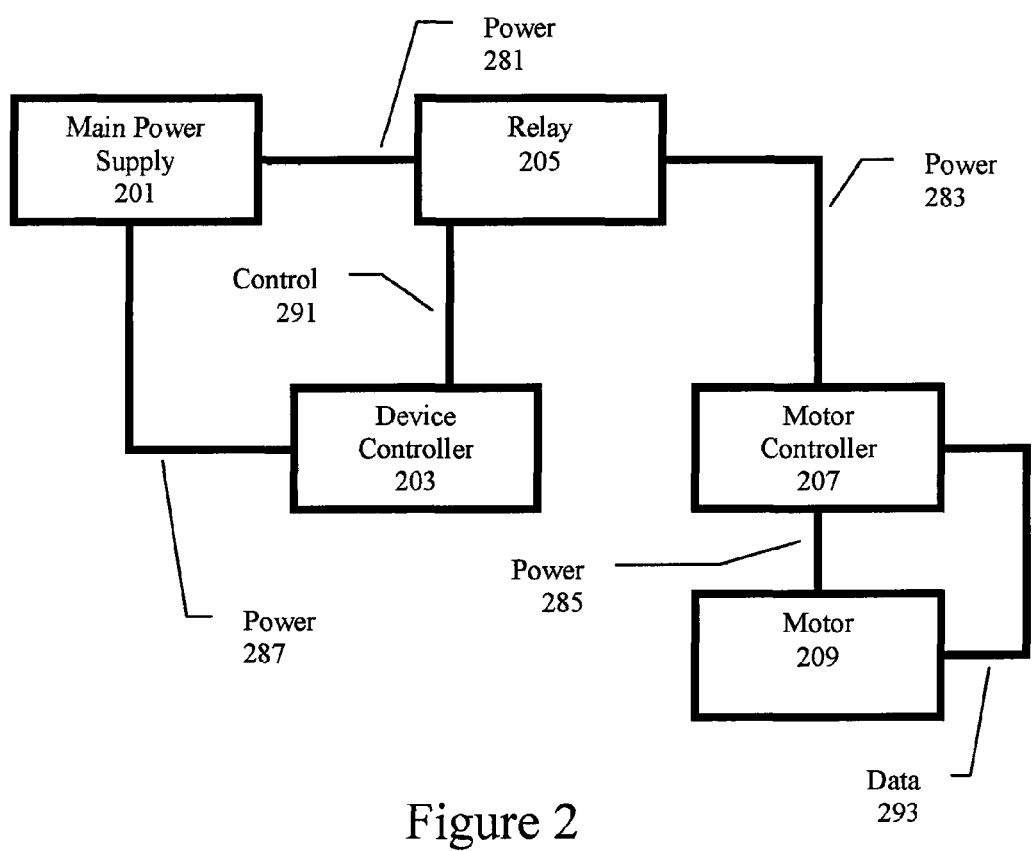
FIG. 2 depicts an innovative system for communication with a motor controller according to an exemplary embodiment.

FIG. 2 depicts an exemplary circuit diagram for a device such as a dishwasher, a food waste disposal unit, or any device having an electric motor. The exemplary device of FIG. 2 comprises a main power supply 201 that may be an alternating current (AC) power supply as is known in the art. Main power supply 201 may or may not comprise a rectifier for converting AC power to direct current (DC) power. The device further comprises a device controller 203 that comprises logic for controlling the high-level operation of the device. For example, in a dishwasher, device controller 203 may comprise logic (such as a microcontroller) for receiving user input (e.g., via buttons and switches) and conducting the operation of various dishwasher components such as a soap dispenser, display lights, one or more water pumps, one or more relays, etc. Relay 205 is operable to connect or disconnect power lines 281 and 283 based on input on control line 291. Motor controller 207 controls the power delivered to motor 209. The motor controller 207 and motor 209 may or may not be located in a single housing. An exemplary motor controller 207 is described in detail below with reference to FIG. 3. Device controller 203 operates relay 205 via control line 291 to connect or disconnect power to motor controller 207 and motor 209. In the embodiment of FIG. 2, no control lines are provided between device controller 203 and motor controller 207. Instead, device controller 203 is configured to send instructions (e.g., profile selection instructions) to motor controller 207 simply by operating relay 205. In an exemplary embodiment, the motor 209 comprises sensors that send data to motor controller 207 via data line(s) 293. Examples of sensors that may be used in a motor include hall sensors, rotary encoder, etc. Hall sensors and/or rotary encoder may be used to sense rotor position.

Motor 209 can be any type of variable speed electric motor. Examples of variable speed electric motors include switched reluctance machine (SRM), controlled induction motor (CIM), brushless permanent magnet (BPM) motor, or universal motor. It will be apparent that a plurality of motors may be operated by a single motor controller.

Figure 3:
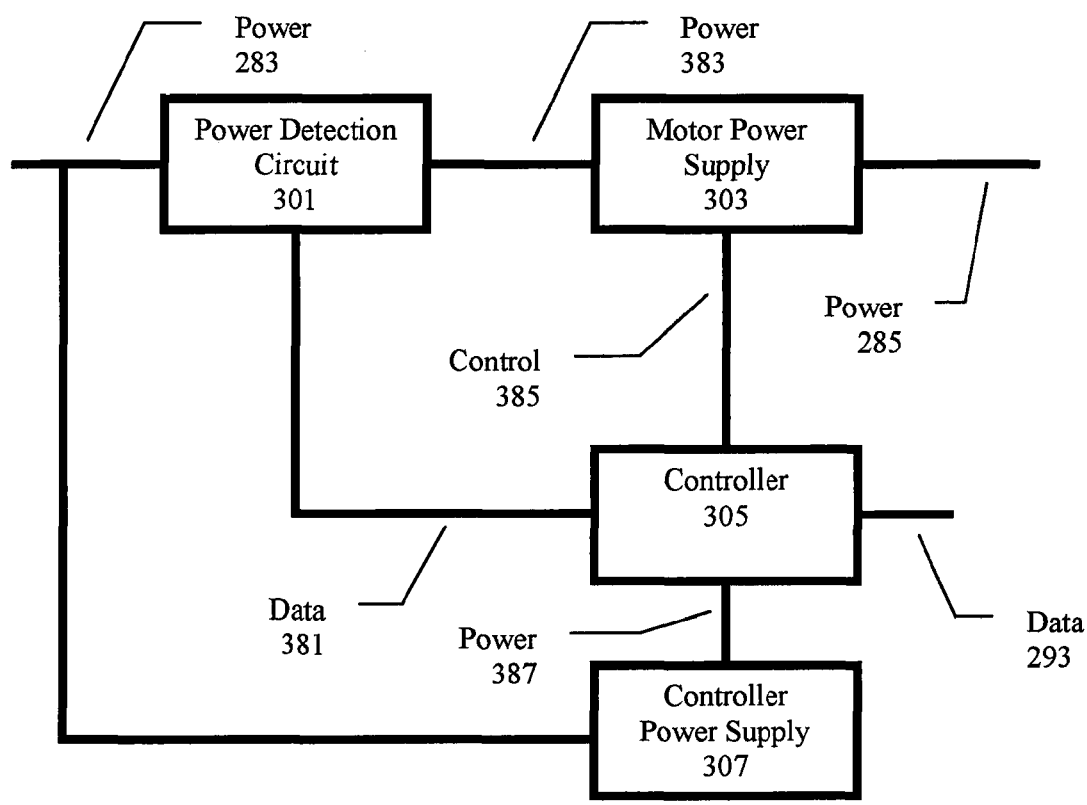
FIG. 3 depicts an exemplary circuit diagram for a motor controller.

FIG. 3 depicts a circuit diagram for an exemplary motor controller, e.g., motor controller 207. The motor controller receives input power via power line 283. Power detection circuit 301 monitors power line 283 and provides an output signal on data line 381 indicative of the status of power line 283. For example, power detection circuit 301 may be configured to provide an output voltage of 5 volts on data line 381 if a sufficient current is detected on power line 283. Motor power supply 303 operates to provide power to one or more controlled electric motors via output power line(s) 285, according to control input received on input control line 385. Controller 305 receives input from power detection circuit 301 via data line 381 and controls the motor power supply 303 via control line 385. Controller power supply 307 provides power to controller 305. The controller power supply may receive power via power line 283 or from another source. In the embodiment of FIG. 3, controller power supply 307 comprises circuitry for converting the power received on power line 283 to a form that is suitable for powering controller 305. Controller power supply 307 may comprise a battery or capacitor having a storage capacity sufficient to power controller 305 for a sufficient period of time. What time is sufficient may depend on the intended application for the motor controller. In an exemplary embodiment wherein the motor controller is intended for use in a dishwasher, the controller power supply 307 comprises a 470 micro-Farad capacitor. Controller 305 controls the motor by controlling motor power supply 303 via control line(s) 385. In the embodiment of FIG. 3, controller 305 comprises a memory for storing data related to a plurality of operating profiles.

As is well known in the art, operating profiles for a motor comprise instructions for controlling the power provided to the motor over time. Controller 305 is configured to select and execute a stored operating profile. In an exemplary embodiment, input power 283 comprises a DC power signal, and motor power supply 303 comprises a pulse width modulation circuit. In another exemplary embodiment, input power line 283 comprises an AC power signal and motor power supply comprises an amplitude modulation circuit. Controller 305 is operable to control the motor power supply to thereby control the level of power delivered to a motor via output power line 285. Controller 305 may comprise logic for processing data received from a controlled motor via data line 293. For example, the motor controller 305 may receive position data from a rotary encoder or hall sensors located in a motor.

Figure 4:
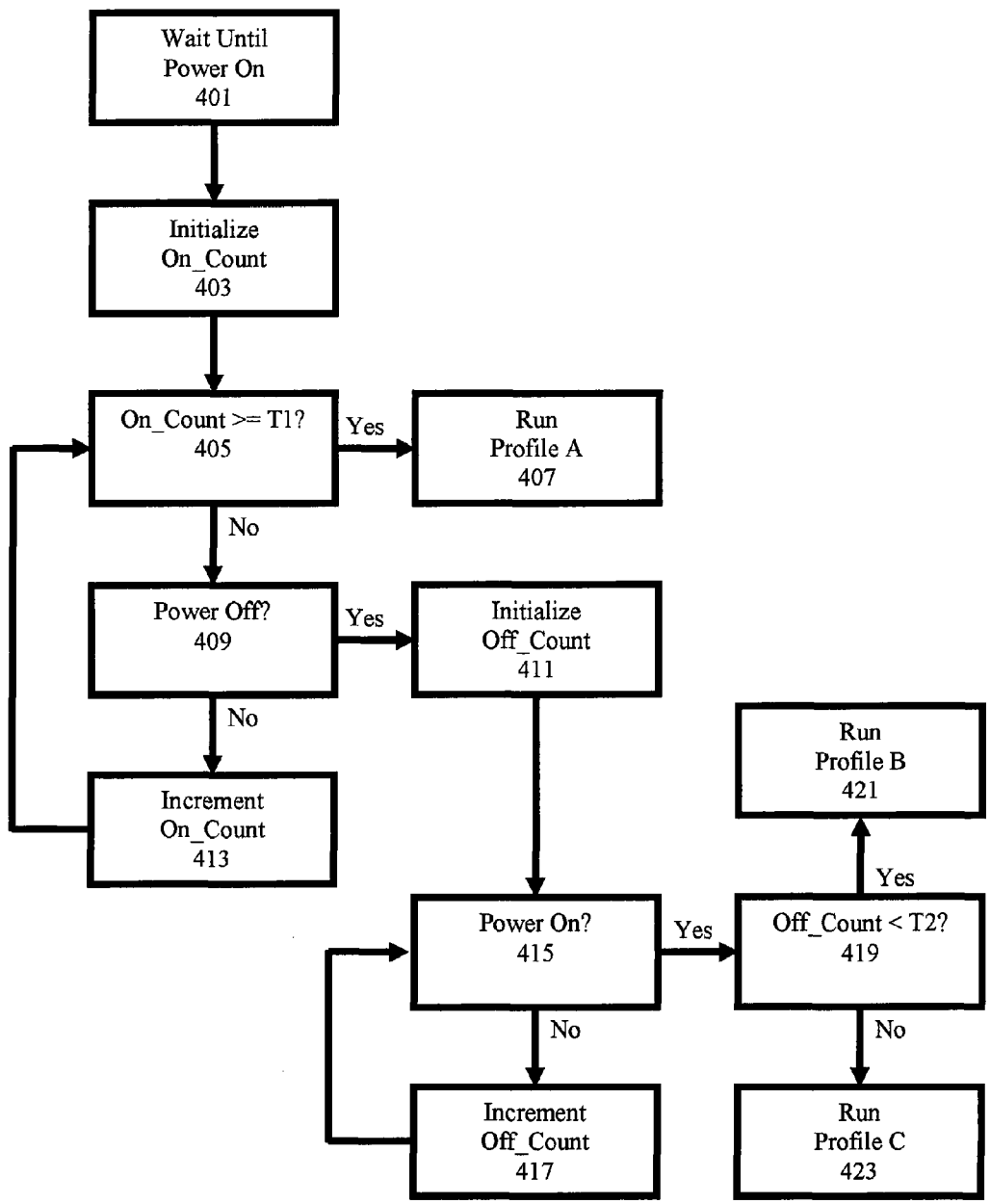
FIG. 4 depicts an exemplary flow chart for selecting a profile in a motor controller.

FIG. 4 depicts an exemplary flow diagram for execution by a motor controller for selecting an operating profile based on the connection and disconnection of input power. At step 401 the controller waits for power to be turned on. When power is turned on, the controller proceeds to step 403 where the variable On_Count is initialized to zero. At step 405, the controller compares the value of On_Count to pre-set constant T1. If On_Count is greater than or equal to T1 then flow proceeds to step 407. If On_Count is less than T1, then flow proceeds to step 409. At step 407 the controller operates the motor according to operating profile A. At step 409 the controller polls an input indicative of power status to determine whether power is off. If power is off then flow proceeds to step 411. If power is not off, then flow proceeds to step 413, wherein the controller increments the value of On_Count. For example, if time is measured in miliseconds (ms) then at step 413 the controller waits 1 ms and then increments On_Count by 1 and returns to step 405. At step 411 the controller initializes the value of a variable Off_Count to zero and flow proceeds to step 415. At step 415 the controller polls the input indicative of power status. If power is on then flow proceeds to step 419. If power is not on then flow proceeds to step 417. At step 417 the controller increments the value of Off_Count, waits for a pre-set period of time (as discussed above with reference to step 413), and proceeds to step 415. At step 419 the controller tests whether the value of Off_Count is less than the pre-set constant T2. If Off_Count is less than T2 then flow process to step 421 where the controller executes operating profile B. Otherwise, flow proceeds to step 423 wherein the controller executes operating profile C.

Figure 5:
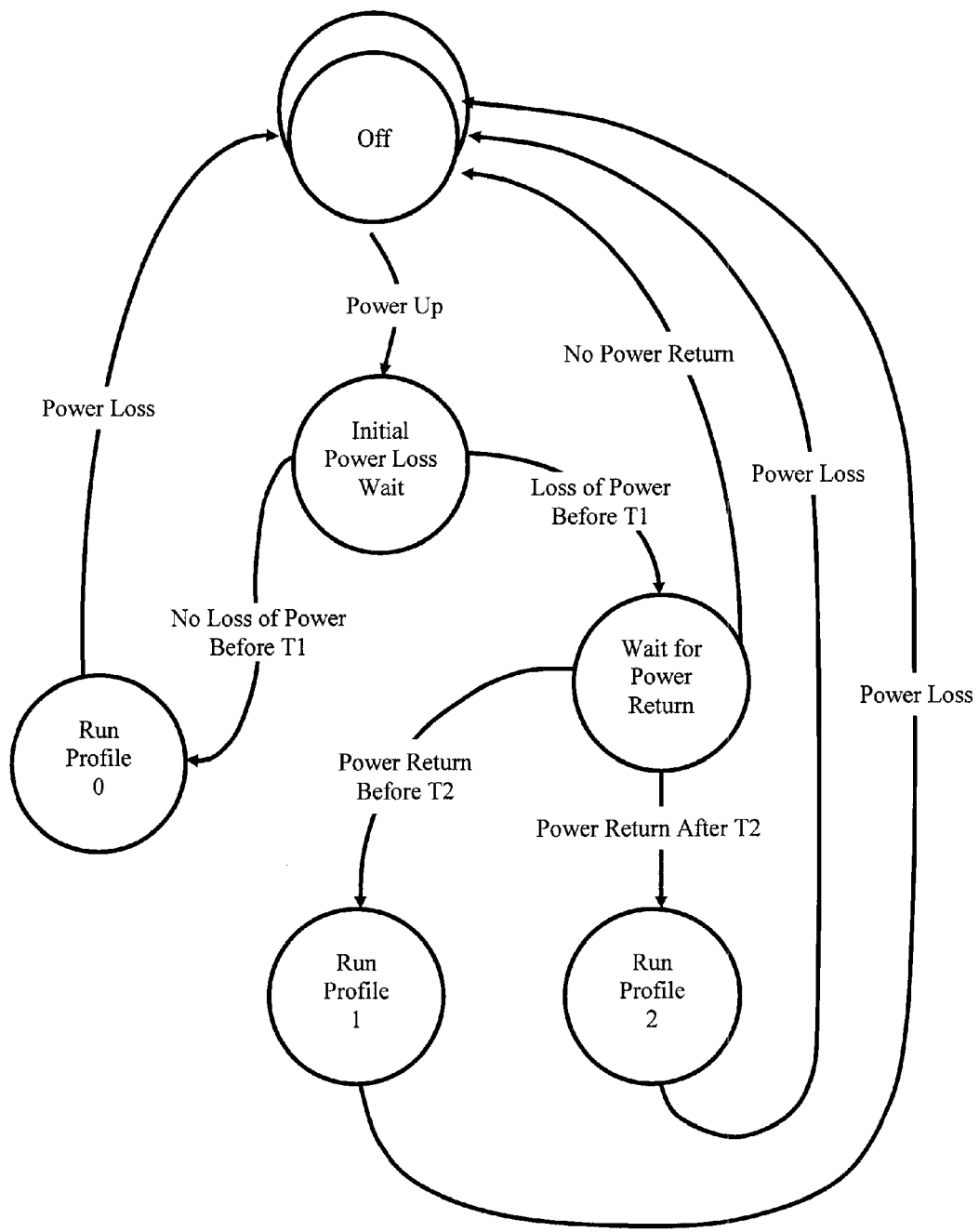
FIG. 5 depicts an exemplary state machine diagram for selecting a profile in a motor controller.

FIG. 5 depicts an exemplary state diagram for execution by a motor controller for selecting an operating profile based on the connection and disconnection of input power.

As disclosed herein, a device controller (e.g., device controller 203) can instruct a motor controller (e.g., motor controller 207) to select a particular profile simply by controlling the connection and disconnection of power to the motor (e.g., via relay 205). The motor controller 207 may be configured to select an operational profile based on the duration of power connection and/or disconnection, for example as shown in FIG. 4. The device controller 203 may then be configured to select an operational profile by operating relay 205 according to the appropriate timing. For example, in the embodiment shown in FIG. 4, the device controller can instruct the motor controller to select operational profile A simply by supplying power continuously for a duration greater than or equal to T1. To select operational profile B, the device controller supplies power to the motor for less than T1, then disconnects power for less than T2, then re-connects power. To select operational profile C, the device controller supplies power to the motor for less than T1, then disconnects power for a length of time greater than or equal to T2, then re-connects power.

In the exemplary embodiment of FIG. 4, three operational profiles (A, B, and C) can be selected by connecting and disconnecting power to the motor and motor controller at appropriate intervals. It will be apparent to those of ordinary skill in the art that more than three operational profiles can be made available by adding additional steps to the exemplary flowchart of FIG. 4. For instance, step 419 could be modified such that Profile B is selected if Off_Count is less than T2, Profile C is selected if Off_Count is greater than T2 but less than T3, and a fourth Profile D is selected if Off_Count is greater than T3.

It should be understood that the pre-set time constants (e.g., T1, T2, T3) are pre-set constants that may be set during manufacture of the controller, or may be set via user input post-manufacture. Exemplary values for T1 and T2 are 150 miliseconds and 300 miliseconds, respectively.

In an exemplary embodiment, the system could be configured to utilize interrupt service routines instead of polling inputs. For example, the data line(s) 381 indicative of power status may be connected to an interrupt input on the controller that causes the controller to be interrupted on a change in the line level. When an interrupt is received, the controller would execute an interrupt service routine that would embody the flow diagram of FIG. 4 or 5.

Exemplary operating profiles comprise quiet, soft start, rinse, maximum speed, and wash mode. In an exemplary embodiment, each profile comprises a soft-startup profile at the beginning of the profile. As is known in the art, slowly ramping up power to the motor has several benefits, including reduced noise, reduced heating, and reduced demagnetization.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. It should be understood that the embodiments disclosed herein include any and all combinations of features as disclosed herein and/or described in any of the dependent claims.

What is claimed is:

1. A motor controller comprising:
   a memory configured to store a plurality of operational profiles for operating an electric motor; and
   a processor configured to (1) receive an input indicative of a change in motor power status, and (2) select an operational profile based on the received input, wherein the processor is configured to select a first operational profile based on a received input indicative of motor power status being on for more than a first pre-set length of time.

2. The motor controller of claim 1 wherein the processor is further configured to (3) provide control output to operate a motor according to the selected operational profile.

3. The motor controller of claim 1 wherein the processor is configured to select a second operational profile based on a received input indicative of motor power status being on for less than the first pre-set length of time, followed by motor power status being off for less than a second pre-set length of time, followed by motor power status being on.

4. The motor controller of claim 1 wherein the processor is configured to select a third operational profile based on a received input indicative of motor power status being on for less than the first pre-set length of time, followed by motor power status being off for more than the second pre-set length of time, followed by motor power status being on.

5. The motor controller of claim 1 wherein the processor is configured to operate an electric pump motor in a dishwasher, and wherein the plurality of operational profiles stored in the memory comprises at least one selected from the group consisting of quiet mode, soft start mode, rinse mode, and wash mode.

6. The motor controller of claim 1 wherein each of the stored operational profiles comprises a soft start mode in the beginning.

7. A motor controller comprising:
   a memory configured to store a plurality of operational profiles for operating an electric motor; and
   a processor configured to (1) receive an input indicative of a plurality of changes in motor power status, (2) store time data indicative of the elapsed time between the plurality of changes, (3) select an operational profile based on the stored time data.

8. The motor controller of claim 7 wherein the processor is further configured to: (4) operate a motor according to the selected operational profile.

9. The motor controller of claim 7 wherein the stored time data comprises an indication of the elapsed time that motor power status has been on.

10. The motor controller of claim 7 wherein the stored time data comprises an indication of the elapsed time that motor power status has been off.

11. The motor controller of claim 7 wherein the stored time data comprises an indication of the elapsed time that motor power status has been on and an indication of the elapsed time that motor power status has been off.

12. The motor controller of claim 7 wherein the operational profile is selected from the group consisting of quiet mode, soft start mode, rinse mode, and wash mode.

13. A method for selecting an operational profile in a motor controller, the method comprising:
   receiving input indicative of power being connected;
   timing the duration that power is continuously connected;
   selecting a first operational profile if power is connected for more than a first pre-set time threshold.

14. The method of claim 13 further comprising:
   receiving input indicative of power being disconnected;
   timing the duration that power is continuously disconnected;
   receiving input indicative of power being connected;
   selecting a second operational profile if power was disconnected for less than a second pre-set time threshold.

15. The method of claim 14 further comprising:
   selecting a third operational profile if power was disconnected for more than the second pre-set time threshold.

16. The method of claim 14 further comprising:
   selecting a third operational profile if power was disconnected for more than the second pre-set time threshold but less than a third pre-set time threshold, and selecting a fourth operational profile if power was disconnected for more than the third pre-set time threshold.

* * * * *